March 2, 1954 F. R. McFARLAND 2,670,828
FLUID EXHAUST MEANS FOR HYDRAULICALLY OPERATED CLUTCHES
Filed Aug. 11, 1950
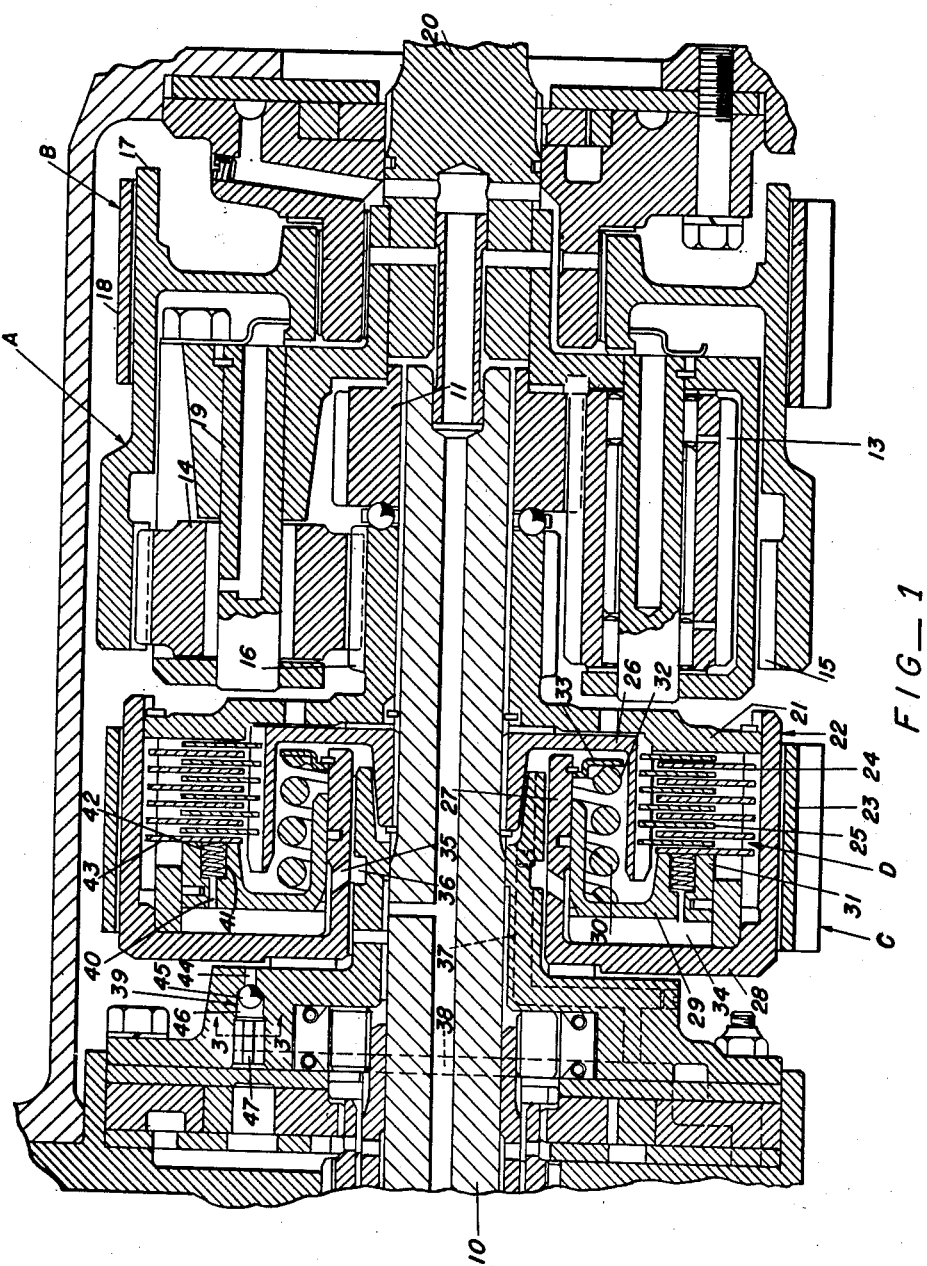
Inventor
FOREST R. McFARLAND Patented Mar. 2, 1954

2,670,828

UNITED STATES PATENT OFFICE 2,670,828

FLUID EXHAUST MEANS FOR HYDRAULICALLY OPERATED CLUTCHES

Forest R. McFarland, Huntington Woods, Mich., assignor to Packard Motor Car Company, Detroit, Mich., a corporation of Michigan Application August 11, 1950, Serial No. 178,975

8 Claims. (Cl. 192—85)

This invention relates to rotatable fluid pressure operated clutches, and particularly to a means for obtaining a complete release of the clutch at high rotative clutch speeds. For purposes of illustration this invention will be described with respect to its application to a speed changing power transmission for automotive vehicles, but it is understood that the invention is not limited to such devices.

It has been proposed to operate a clutch of the friction type by fluid under pressure acting against a piston which compresses the driving and driven members of the clutch together for rotation in unison. In one popular form, the piston is annular in shape and is confined in an annular cylinder secured to either the driving or driven clutch member and rotatable therewith. Under certain circumstances the clutch may be in a released condition while the two members are rotating at high speed due to associated gearing being operated in other driving relationships. If the fluid used to operate the clutch is oil, the release of the clutch is effected by venting the fluid behind the piston and allowing the fluid to escape to the sump. It has been found that despite the venting of the fluid, not all of the fluid escapes from the cylinder, due largely to the fact that it is necessary to vent the cylinder through the shaft which is at a smaller radius than the outermost radius of the cylinder and allows a portion of the fluid to remain in the cylinder and venting passage. The fluid that remains is then rotated at the high speed of the associated clutch member and perforce develops a relatively high pressure head which acts against the piston to engage the clutch.

Thus under conditions described above the clutch may be urged toward the engaging position even though the operator has conditioned the fluid pressure system for disengagement of the clutch. The resulting damage to the transmission or vehicle or both is readily apparent.

The principal object of this invention is to provide a means for effecting a complete release of a fluid operated clutch using a rotating piston and cylinder as the clutch operating means.

A more specific object of this invention is the provision in a rotating piston of a means for preventing the undesired creation of a pressure head behind the piston by residual fluid after the operating fluid has been vented.

Yet another specific object of this invention is to provide a means for completely removing the trapped fluid behind a rotatable clutch operating piston to prevent the undesired operation of the clutch, said means including a check valve for automatically admitting air into the space occupied by the fluid, whereby to insure the removal of the fluid.

A further specific object of this invention is to provide a vent valve for a fluid-operated multiple-plate friction clutch in which one of the plates performs the function of the vent valve.

These and other objects of this invention will become apparent from the following detailed description when taken together with the accompanying drawings in which—

Fig. 1 is a section through a change speed transmission utilizing a multiple plate friction clutch and an annular piston for operating the clutch, said piston having a vent valve therein which is constructed in accordance with the teachings of this invention; and Fig. 2 is a section through an air inlet valve associated with the vent valve shown in Fig. 1.

Referring now to the drawings for a detailed description of the invention there is shown a drive shaft 10 which is splined to a sun gear 11 of a complex planetary gear set A. Said gear set includes, in addition to the sun gear 11, a plurality of crossed planet gears 13 meshing with sun gear 11, a plurality of planet gears 14 meshing with planet gears 13 and a ring gear 15 and a sun gear 16 meshing with planet gears 14. Ring gear 15 is made as a unit with a drum 17 forming the rotatable part of a friction brake B. The stationary part of the brake B is a band 18 operated by any suitable means to contract against the drum 17 to arrest the rotation of the drum.

Planet gears 13 and 14 are mounted on a carrier 19 which is fixed to rotate with an output shaft 20. Thus when brake B is operated, ring gear 15 is held against rotation, and with sun gear 11 driven by shaft 10, carrier 19 and shaft 20 will be rotated in a reverse direction and reduced speed with respect to shaft 10.

Sun gear 16 is free to rotate on shaft 10 and is formed with a flange 21 to which is splined a drum 22. Said drum 22 forms with a substantially stationary band 23 a second brake designated generally by the reference character C. When brake C is operated, sun gear 16 is held against rotation, thus causing carrier 19 to rotate in the same direction as, and at a reduced speed with respect to, shaft 10.

Within drum 22 is a multiple plate friction clutch D comprised of a plurality of plates 24 splined to drum 22, and a corresponding plurality of plates 25 disposed between plates 24, each plate 25 being splined to a hub member 26 which, in turn, is splined to shaft 10. Thus the operation of clutch D couples sun gear 16 to shaft 10, and since gear 11 is splined to shaft 10, the operation of clutch D locks the two sun gears together and establishes a direct drive between shaft 10 and output shaft 20.

Drum 22 is a hollow annulus having in addition to the part contacted by band 23, an inner cylindrical part 27 and a radially disposed part 28. Thus drum 22 and the parts 27 and 28 therefore form an annular cylinder. Within the said cylinder is located a piston 29 having a skirt 30 and an outer flange 31, the latter serving as the pressure transmitting means for the piston 29. A spring 32 encircles skirt 30 and is retained in compression between piston 29 and an abutment 33 on cylindrical part 27. Spring 32 therefore serves to urge piston 29 to the left as viewed in Fig. 1, that is, it urges piston 29 into the annular cylinder. The space 34 in the cylinder is adapted to be filled with fluid under pressure through one or more bores 35 in cylindrical part 27 aligned with a peripheral groove 36 communicating with a passageway 37 connected through another passageway 38, to a check valve 39 and to a source of fluid under pressure (not shown). It is contemplated that the fluid will be controlled by suitable valves such as those disclosed in my co-pending application Serial No. 71,128, filed January 15, 1949, so that when it is desired to operate clutch D, fluid under pressure will be admitted to space 34 to urge piston 29 to the right as viewed in Fig. 1, to compress plates 24 and 25 against flange 21, and when it is desired to release clutch D, the fluid in space 34 will be vented and spring 32 will move piston 29 to the left as viewed in Fig. 1 as aforesaid to allow plates 24 and 25 to separate.

It will be noted that even when released, clutch D, and particularly the fluid in space 34 will be rotated at the speed of sun gear 16, and hence any fluid remaining in said space will be rotated, likewise and will develop a pressure head which likewise increases as the square of the velocity. This pressure head may become high enough to overcome the resistance of spring 32 and operate clutch D, even though space 34 may be vented. Such undesired operation of the clutch is of course to be avoided.

The means used to avoid the building up of pressure in space 34, when clutch D is to be released comprises one or more bleed openings 40 in outer flange 31 connecting space 34 with recesses 41 in which are disposed springs 42 compressed between the bottom of the said recesses 41 and the first plate 43 of the plurality of plates 24 splined to drum 22. Bleed openings 40 are smaller in cross sectional area than the area of the bores 35 so that when fluid under pressure is admitted to space 34 it cannot escape through bleed openings 40 as fast as the fluid enters space 34. The presence of bleed openings 40 therefore cannot prevent movement of piston 29 to the right as viewed in Fig. 1 against the resistance of spring 32. Continued movement of piston 29 in this direction compresses the two sets of plates 24 and 25 together and against flange 21, and by this action plate 43 will be held firmly against recesses 41 to prevent escape of fluid under pressure from chamber 34. Plate 43 thus functions as a plate valve for bleed openings 40.

When clutch D is released, spring 32 will return piston 29 to its left-hand position (Fig. 1) and permit a separation of the plates 24 and 25. Springs 42 will then push plate 43 away from piston 29 and specifically away from recesses 41, thereby theoretically allowing residual fluid in space 34 to escape through bleed openings 40 and the recesses 41. If all of the residual operating fluid in space 34 is removed, the undesired building up of pressure due to rotation of drum 22 will be avoided and clutch D will be released as desired.

It has been found that providing an opening such as 40 for the escape of trapped fluid is not always sufficient to prevent the undesirable accumulation of fluid in space 34. The escaping fluid must be replaced with air, otherwise an unbalanced pressure system is produced in the fluid flow passages as explained below, which tends to produce a reduced pressure behind the fluid flowing from space 34, which of course would retard the removal of such fluid. Under certain circumstances, the unbalance in pressure might be so great as to produce a circulation of fluid from the fluid supply and vent lines forming a part of the controls, through the passages 38 and 37, and space 34 to maintain the space full, even though the clutch should be released. It is therefore desirable to vent the pressure line between chamber 34 and the controls in order to admit air through the line and into chamber 34 to replace the oil with air as rapidly as possible. This can be done by a common type of ball check valve, one form of which is shown in this disclosure. Check valve 39 is provided in passageway 38 which is in hydraulic communication with space 34, said valve 39 being designed to open a port 44 by means of a ball 45 retained in an opening 46 by a cross-shaped plug 47 shown in cross section in Fig. 2. When the controls are operative to cause the pressure to fall within passage 38, the check valve 39 opens and air can pass through opening 44 through the channeled sides 48 of the plug 47 and into passage 38. It will be noted that bleed openings 40 are located at as great a radius as is possible so that nearly all of the fluid in space 34 can be drained out of the said space by centrifugal force. The fluid in peripheral groove 36 and passageways 37 and 38 will thus be at subatmospheric pressure due to this centrifugal "pumping" action and contrariwise the pressure of the fluid in bleed openings 40 will be at higher than atmospheric pressure. This subatmospheric pressure causes ball 45 to be drawn to the left, as viewed in Fig. 1, to uncover port 44 to admit air to take the place of the fluid escaping through bleed openings 40, thereby hastening the removal of the fluid from space 34.

When clutch D is operated, opening 46 is filled with fluid under clutch operating pressure through passageways 37 and 38 and will hold ball 45 against opening 44 to close the check valve 39.

The use of a check valve such as 39 renders the successful operation of the emptying means independent of any valving that may be used to control the operation of the clutch D. Were it not for check valve 39, a corresponding function would have to be performed by the valving and this might not be convenient or desirable from the standpoint of the functioning of the transmission as a whole.

It is understood that the foregoing description is merely illustrative of a preferred embodiment of the invention and that the scope of this invention is not to be limited thereto but is to be determined by the appended claims.

What is claimed is:

1. In combination, a rotatable cylinder, a piston in the cylinder, a coupling operated by the piston, means for introducing fluid under pressure into the cylinder to operate the coupling, said pressure being releasable to render the coupling inoperative, and means for substantially emptying the cylinder of residual fluid when the pressure is released, said last-named means comprising a bleed opening in the piston, means for closing the bleed opening upon partial operation of the coupling, and a pressure differential operated valve in communication with the pressure fluid on one side and with atmospheric pressure on the other, said valve being adapted to admit air into the fluid introducing means when the fluid pressure falls below atmospheric.

2. In combination, a rotatable cylinder, a piston in the cylinder, a multiple plate friction clutch operated by the piston, means for introducing fluid under pressure into the cylinder to operate the clutch, said pressure being releasable to render the clutch inoperative, and means for substantially emptying the cylinder of residual fluid, said last-named means comprising a bleed opening in the piston adjacent one of the plates of the clutch and adapted to be closed by said plate upon partial operation of the clutch, resilient means interposed between the piston and the said adjacent plate to prevent the closing of said bleed opening except upon the introduction of fluid under pressure into the cylinder, and a pressure differential operated valve in communication with the pressure fluid on one side and with atmospheric pressure on the other, said valve being adapted to admit air into the fluid introducing means when the fluid pressure falls below atmospheric.

3. In combination, a rotatable cylinder, a piston in the cylinder, a friction clutch operated by the piston, said clutch including a movable plate, means for introducing fluid under pressure into the cylinder to operate the clutch, said pressure being releasable to render the clutch inoperative, and means for substantially emptying the cylinder of residual fluid, said last-named means comprising a bleed opening in the cylinder terminating in proximity to the clutch plate, said opening being enlarged at the clutch plate, a spring in the enlarged opening urging the plate away from the opening, said bleed opening allowing less fluid to pass therethrough than is admitted by the means for introducing fluid under pressure into the cylinder, such that the piston is moved against the clutch plate to close the bleed opening despite the force of the spring tending to separate the piston and plate, and means for replacing the residual fluid in the cylinder with air after the fluid pressure in the cylinder is released.

4. The combination described in claim 3, said means for replacing the residual fluid in the cylinder with air comprising a check valve in communication with the cylinder and with the atmosphere and adapted to open the cylinder to atmospheric pressure when the pressure in the cylinder becomes less than atmospheric.

5. In combination, a rotatable cylinder, a piston in the cylinder, a coupling operated by the piston, means for introducing fluid under pressure into the cylinder to operate the coupling, said pressure being releasable to render the coupling inoperative, and means for substantially emptying the cylinder of residual fluid when the pressure is released, said last-named means comprising a bleed opening in the piston, means for closing the bleed opening upon partial operation of the coupling, and a non-rotating pressure differential operated valve in fluid communication with the cylinder and with the atmosphere and adapted to admit air into the cylinder when the pressure in the cylinder falls below atmospheric pressure and to close when the pressure in the cylinder exceeds atmospheric pressure.

6. The combination described in claim 5, said non-rotating pressure differential operated valve comprising a ball check valve.

7. The combination described in claim 5, said non-rotating pressure differential operated valve comprising a ball check valve, and means for limiting movement of the valve in response to atmospheric pressure, said movement limiting means comprising a plug in the fluid communicating with the cylinder, said plug having an abutment adapted to contact the ball at substantially one point and a passage spaced from the abutment to allow fluid to pass through the plug to and from the cylinder.

8. The combination described in claim 5, said non-rotating pressure differential operated valve comprising a ball check valve, and means for limiting movement of the valve in response to atmospheric pressure, said movement limiting means comprising a plug in the fluid communicating with the cylinder, said plug having a cross-shaped section normal to the flow of fluid therethrough and a plane surface at the end thereof adjacent the ball such that when the ball contacts the plug at the plane-surfaced end thereof under the influence of atmospheric pressure, said ball will permit the passage of air through the plug.

FOREST R. McFARLAND.

References Cited in the file of this patent

UNITED STATES PATENTS

| Number | Name | Date |
|---|---|---|
| 1,934,850 | Fromaget | Nov. 14, 1933 |
| 2,143,321 | Kegresse | Jan. 10, 1939 |
| 2,170,538 | Sarver | Aug. 22, 1939 |
| 2,386,217 | Kegresse | Oct. 9, 1945 |
| 2,386,220 | Lawler et al. | Oct. 9, 1945 |
| 2,495,988 | Sheppard | Jan. 31, 1950 |
| 2,583,919 | Wilson | Jan. 29, 1952 |

FOREIGN PATENTS

| Number | Country | Date |
|---|---|---|
| 109,420 | Sweden | Dec. 28, 1943 |
| 684,091 | Germany | Nov. 22, 1939 |